April 4, 1939.  J. B. MacHARG  2,153,149
LANTERN SLIDE
Filed May 8, 1937
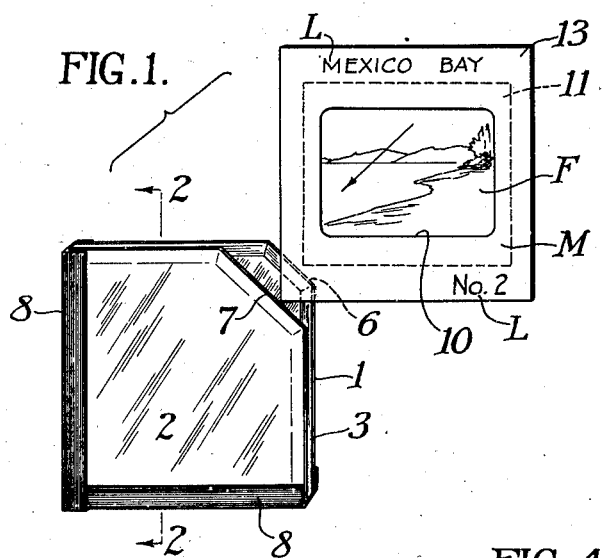
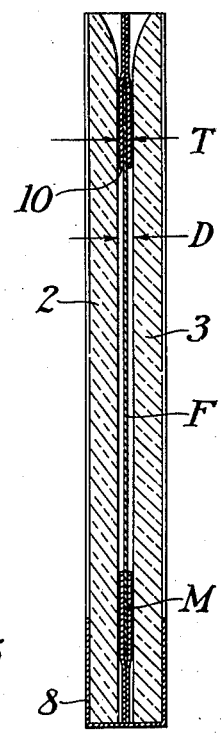
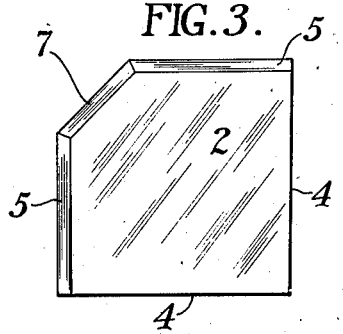
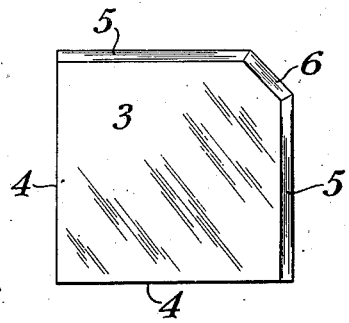
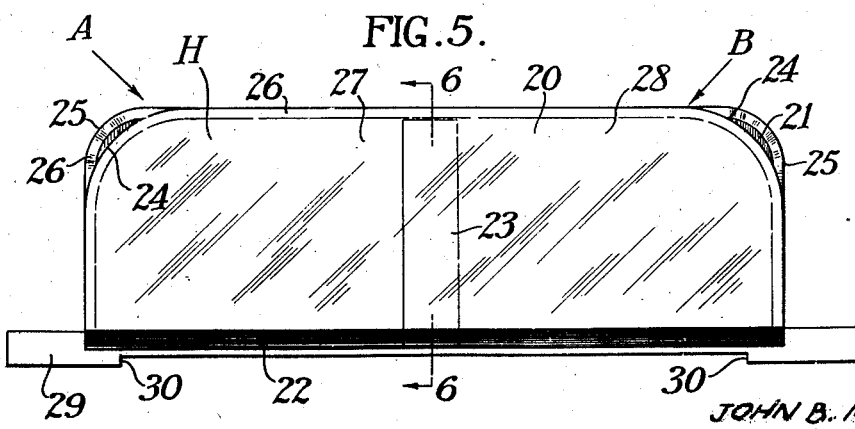
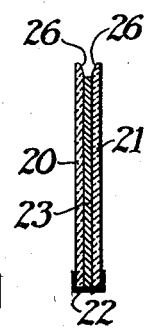
JOHN B. MAC HARG,
INVENTOR.
BY
ATTORNEYS Patented Apr. 4, 1939

2,153,149

UNITED STATES PATENT OFFICE 2,153,149

LANTERN SLIDE

John B. MacHarg, Appleton, Wis., assignor to Eastman Kodak Company, Rochester, N. Y., a corporation of New Jersey Application May 8, 1937, Serial No. 141,490

1 Claim. (Cl. 88—26)

This invention relates to lantern slides for use in projection apparatus.

One object of my invention is to provide a lantern slide which is extremely inexpensive and which affords adequate protection for films bearing the image to be projected. Another object of my invention is to provide one main lantern slide which serves as a holder for a series of individually mounted films. Another object of my invention is to provide a composite lantern slide in which the film is held flat between two sheets of glass during projection and in which a film carried in a masking device can be readily inserted and removed after projection, so as to be readily stored in a relatively small space. Another object of my invention is to provide a lantern slide made from two pieces of glass fastened together around two edges, with the remaining edges open for the insertion and removal of a masked film, and other objects will appear from the following specification, the novel features being particularly pointed out at the claims at the end thereof.

With the present type of so-called miniature camera, negatives approximating the size of a motion picture film frame on 35 mm. film can be readily made, and a large number of these films can be stored in an extremely small space, if the individual films are not permanently mounted between sheets of glass.

It is, however, necessary, in order to properly protect a film from heat and damage during projection, to mount the films between sheets of glass, and by means of my present invention, two or more temporary holders may be used so that the individual films may be inserted and removed from their protective holders at the time of projection. The holder is so arranged that it can be readily loaded and unloaded in a darkroom by the sense of touch alone, if necessary.

When the slides to be projected are on film, it is, of course, necessary to space the surfaces of the film from a position in which they might be readily handled or become scratched. If my improved holder is used properly, the surfaces of the film will be adequately protected.

Coming now to the drawing, wherein like reference characters denote like parts throughout:

Fig. 1 is a perspective view of a film holder constructed in accordance with a preferred embodiment of my invention, the masked film to be used in the holder being shown only partially inserted in place.

Fig. 2 is an enlarged sectional view taken on line 2—2 of Fig. 1, but with the masked film shown in position for projection.

Figs. 3 and 4 are plan views of the two glass members which may be fastened together to form the preferred type of holder shown in Fig. 1.

Fig. 5 is a plan view of another embodiment of my invention.

Fig. 6 is a sectional view taken on line 6—6 of Fig. 5.

While it is obvious that my improved holder may be made in any size, so that it may be used in any standard projection equipment, it has been particularly designed for projectors for film of the miniature size.

As indicated in Fig. 1, the holder, which may be designated broadly as 1, may consist of two sheets of glass 2 and 3, each of these glasses having two plain edges 4 and two beveled edges 5.

The corners of the beveled edges are likewise beveled, one corner 6 of the glass 3 being shorter than the corresponding corner 7 of the glass 2. The reason for this is that when a film F, mounted in a suitable mask M, is to be inserted between the two glass plates 2 and 3 in a darkroom, such as may be used for projection, with the plates constructed as above described, one corner of the masked film may be readily inserted, by moving the corner till it snaps over the cutoff 7 onto the face of the glass 3, and by moving it downwardly in the direction shown by the arrow in Fig. 1 into place, it can be properly inserted by feel alone.

The glasses 2 and 3 are preferably bound together along their plain edges 4, by means of a suitable binding, such as adhesive tape 8. In making up the holder 1, which may be considered as a temporary holder for the masked picture, it is preferable to space the plates a distance D, somewhat greater than the thickness T of the masked film. This can readily be done by inserting a card a few thousandths of an inch greater in thickness than the normal masked film, laying the glasses on the card, and binding them together with the tape 8 into a permanent relation. Then, by sliding out the card, the glasses of the holder will be properly spaced for use. The film F may be masked in any suitable manner and I have found that such a film can be adequately taken care of by means of a mask made of thin material having an opening or frame 10 for controlling the size of the image to be projected, this opening overlying and being fastened against edge portions 11 of the film. It is convenient to form the mask M by a pair of frame members having adhesive on one surface, and by pasting the two adhesives against each other, the film F is definitely positioned in the mask M. A relatively heavy paper is quite suitable for the masking members, and since the thickness of the paper lies between the face of the film F and the glasses against which the masked film slides, the glass does not actually come in contact with the film so that there is no tendency to scratch the delicate surface in loading and unloading the holder 1.

When the masked film has been fully inserted in the holder, it may be handled like the ordinary type of lantern slide. However, it is unnecessary to furnish a separate holder with each masked film because they may be readily inserted and removed from the holder. One corner of the mask 13 will project from the beveled corners 6 and 7 of the glasses 2 and 3 when the masked film is fully inserted in the holder. This serves as a handle for manipulating the masked film.

In Fig. 5, I have shown a second embodiment of my invention wherein the glasses 20 and 21 may be joined along their bottom edges by means of the adhesive strip 22, this strip forming a hinge permitting the two plates to separate. Along the central portion of one of the glasses, here shown as 21, I have attached a cardboard strip 23 of a thickness somewhat greater than a film F mounted in a mask M. The upper corners of the glasses 20 and 21 are rounded, as indicated at 24 and 25, and each of the two plates are beveled at 26 along their top edges and their end edges to facilitate entering a masked film therein, as indicated in Fig. 1.

In this form of my invention, the cardboard strip 23 forms a stop, limiting the inward movement of a masked film, a film being placed in each side by moving in the direction shown by the arrows A and B. Thus, the holder, designated broadly as H, may be slid back and forth in the usual type of projection apparatus to expose films, held between the sides 27 and 28 of the slides, to the light beam, one at a time. When the film in side 27 is being exposed, the side 28 of the holder projects from one side of the lantern and a masked film can be readily inserted and removed.

If desired, the holder may fit into a metal track member 29 having shoulders 30 forming stops to limit the movement of the slide in both directions. Such stops are well known in projection apparatus.

With the film holder described above, it will be readily seen that it is only necessary to provide two of the holders shown in the first four figures or one of the holders shown in the second embodiment of my invention in Fig. 5, in order to project as many different pictures or slides as is desired.

Each of the picture bearing elements—here shown as films—are carried in their own separate frames and are inserted and removed from the holders just before and after projection. Thus, it is possible in a very small sized container, to take care of a large number of different slides, and it is a simple matter to write legends, indicated at L, directly on the paper masking member for indexing and other purposes.

This system is extremely inexpensive, as the masks for the film are preferably made of paper and as the holders themselves are also quite inexpensive to make.

What I claim is:

A holder for lantern slides comprising a pair of spaced substantially rectangular plates, a binding holding pairs of adjacent edges of the plates in spaced relation, pairs of adjacent edges of the plates diagonally opposite the edges bound together being left open for the diagonal positioning and removal of a lantern slide, the facing edges of the open pair of adjacent plates including a beveled surface to facilitate loading a slide therebetween, one beveled corner projecting beyond the other to facilitate entering the slide, the spacing plates being substantially equal to the thickness of a normal lantern slide, and the spacing at the beveled edges being considerably greater than the thickness of a slide, whereby the slide may be readily moved diagonally through the two open sides between the spaced plates and the slide may be positioned by the bound edges of the slide holder.

JOHN B. MacHARG.